Nov. 29, 1966 J. RABINOW 3,289,164

CHARACTER NORMALIZING READING MACHINE

Filed April 29, 1964 4 Sheets-Sheet 1

INVENTOR

Jacob Rabinow

BY Joseph A. Genovese

ATTORNEY

INVENTOR
Jacob Rabinow
BY Joseph A. Genovese
ATTORNEY

Nov. 29, 1966 J. RABINOW 3,289,164
CHARACTER NORMALIZING READING MACHINE
Filed April 29, 1964 4 Sheets-Sheet 3
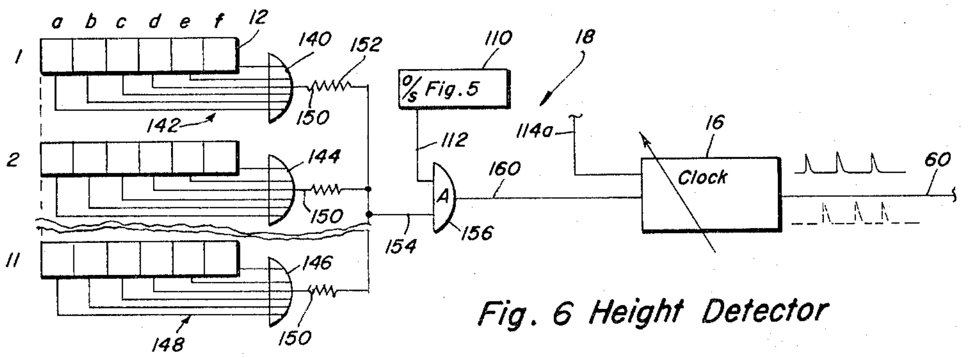
Fig. 6 Height Detector
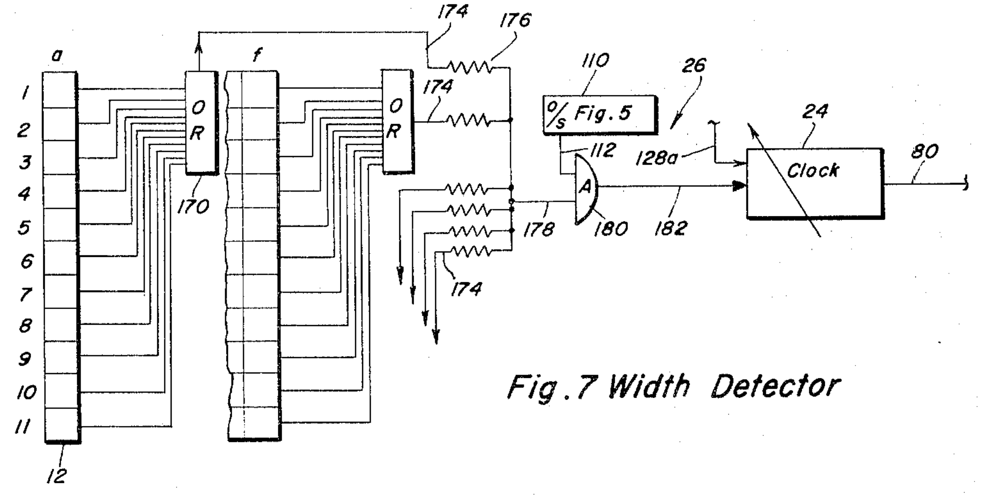
Fig. 7 Width Detector
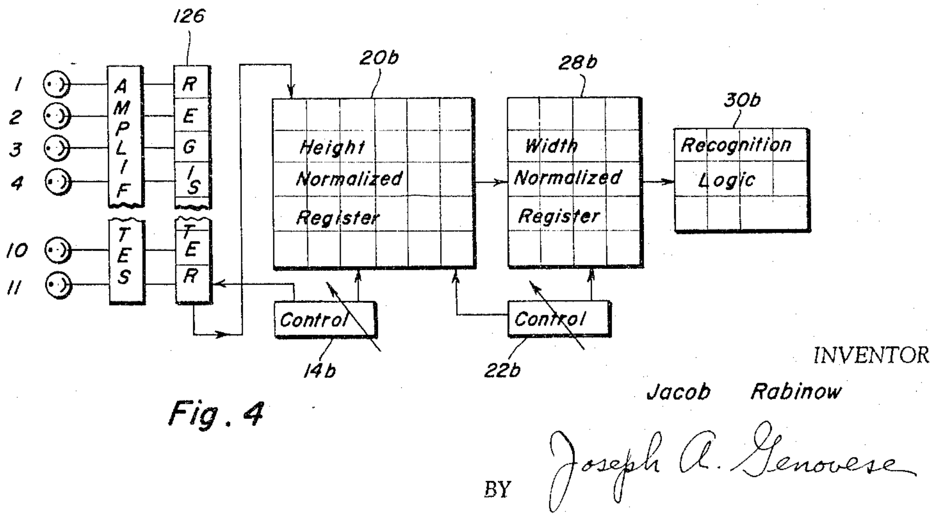
Fig. 4
INVENTOR
Jacob Rabinow
BY Joseph A. Genovese
ATTORNEY INVENTOR
Jacob Rabinow
BY Joseph A. Genovese
ATTORNEY 3,289,164

CHARACTER NORMALIZING READING MACHINE

Jacob Rabinow, Bethesda, Md., assignor to Control Data Corporation, Rockville, Md.

Filed Apr. 29, 1964, Ser. No. 363,358
10 Claims. (Cl. 340—146.3)

This invention relates to character reading machines and particularly to the problem of identifying patterns, characters, etc. of different size by the same machine.

One of the main difficulties encountered by present reading machines is the problem of reading characters of varying size where such variance may be as much as three-to-one. While I am aware that the recognition logic of machines can be so designed that size makes little difference, most modern machines, particularly of the area correlation type, perform their recognition by matching the unknown character with a series of physical or electronic masks where each mask is designed for a specific size character. By masks I mean not only physical transparencies but also correlation resistor adders or the equivalent, which examine areas of the character for black or white or grey.

Many machines scan the document containing the unknown characters and transform the character into a series of binary or analog information quanta which appear in registers of various kinds. These may be shift registers where the information can be moved vertically, horizontally, or both, or they may be registers connected directly to a retina of photocells where the electrical information appears simultaneously as the character is scanned.

My invention enables the machine to take this information after it appears in a first register and rearrange the information into another register in a manner such that the size of represented character is changed whereby the number of elements of character data in the new register is different from the number of elements in the original or first register. An example may lead to a better understanding of this concept. Assume that a character is scanned by a single point scanner, i.e. as in Patent No. 2,933,246, or by a line of photocells as in Patent No. 3,104,369, or by a retina of photocells as disclosed in Patent No. 3,201,751, and that the character information appears in a first register which is 200 elements tall and 70 elements wide. Assume further that this register is sufficiently large to store the largest character pattern that the machine is called on to identify. The smallest character may be 45 elements tall and 30 elements wide if plotted on the same scale. Now, assume that the scanning system has loaded the register with information describing a character that just fills the register, i.e. 200 elements tall and 70 elements wide. I can either know in advance, or the machine can determine, that this is the height of the character (200 elements tall). By means of my invention the effective size of the character can be reduced so that it will appear in a second register as a character having a 45 element height. To do this I shift the character-data from the first register at a known rate, for instance at a shift rate of ten microseconds per stage. With 200 vertical stages, this would mean that 2,000 microseconds are required to unload the character-describing information from the first register.

My second register is 45 stages tall because this is the height to which all of the characters are normalized (in my example). Assume that the second register is also 70 elements wide, i.e. the maximum width tolerance for which the machine is designed. My invention transfers the pattern data from the vertical columns of the first register to the columns of the second register. At the same time the pattern data in each 200 element column is rearranged to fill the corresponding 45 element column of the second register. One way of accomplishing this is to use a clock which, in 2,000 microseconds, samples an electrical signal 45 times, or in other words, takes 45 successive 44.4 microsecond samples. Thus, I can do the following: empty (shift out) the first register during the same time that the second register is loaded with this character-describing data by sampling the data at the rate of 44.4 microseconds per sample. The large character that filled the original register will now enter the new register and just fill it. The filling of the second register takes exactly the same time as emptying the first register (2,000 microseconds).

For this sample example it may be easier to assume that if any pattern signal (such as "black") appears during a single sample time (44.4 microseconds), a pattern signal (e.g. "black") will be entered into the second register. It is emphasized that the shift pulses for the first register and the loading clock frequency for the second register need not be synchronized, and that the overall emptying time interval of the first register and loading time of the second register must match.

With the character-describing data in the second register, normalized vertically but unchanged horizontally, I can perform a second operation to normalize the horizontal size by unloading the second register into a third register which is (in my example) 45 elements tall and only 30 elements wide. I use the above described sampling system to accomplish the width normalizing. Specifically, I sample the pattern data as it moves horizontally out of the second register by a clock running at a rate that loads 30 elements in the third register while the second register shifts 70 times. The character-describing data will then appear in the third register as 45 elements tall and 30 elements wide.

It is obvious that my above procedure implies double or triple quantizing of the original image, where quantizing refers to the area and not intensity. If the first grid (vertical and horizontal scanning bit rate) is fine enough, i.e. much finer than the second or third, the noise and distortions introduced by multiple quantizing are quite minor. If one grid is only slightly different from another, the distortion thus introduced may be quite noticeable. Because of the random relationship of the two sets of elements, the line thicknesses of a character may be changed by a whole element. This distortion can be tolerated in character recognition machines. In general, the tolerances to quantizing distortions are matters that are affected by the type of character, the number of characters to be identified, the ratio of the character line thickness to the character height and width, etc. In any case the first area quantizing can be made sufficiently fine so that all subsequent digital processing will introduce negligible quantizing effects.

It is interesting to note that the character, as originally scanned, need not be loaded into a full register before digital size normalizing is begun. If the equipment "knows" in advance the size of the character, for example, as in the case where a pre-scanner is used, or advance information about the size of the character is available, the machine can set its scanning rate to be such that at least one dimension of the character is normalized by the scanner. For instance, by using a vertical row of photocells as a scanner, I can set the horizontal sampling rate so that the character is always sampled a fixed number of times regardless of the width of the character. In the case of a single point scanner, such as a mechanical disk, the sampling times can be set to dissect the vertical height of the character always into a fixed number of elements.

I am aware that certain scanning systems, such as those which use cathode ray flying spots, can accomplish normalizing in the scan directly. My invention is not concerned with this approach for various reasons. It is sometimes preferred not to use variable scanning means, particularly when very high speed is required. This invention is concerned with digital normalizing of a character size by electronic means in the machine itself. It gives rise to particular advantages in that normalizing can be done several times, if necessary, so that different sizes can be tested; characters can be transformed into different sizes in parallel equipment, or serial equipment, and the great flexibility and speed of purely electronic equipment can be used.

An object of my invention is to overcome size variation problems in character reading machines by normalizing character-describing data internally of the machine in a manner substantially in accordance with the foregoing.

A further object of my invention is to provide a normalizing facility within a reading machine in which pattern data stored within the machine is quantized into quanta, i.e. elemental areas comprising the pattern, and in which these quanta are rearranged into other quanta to change the number of quanta into which the pattern is dissected.

Another object of my invention is to provide a normalizing system for reading machines wherein the character-describing data which is stored internally of the machine (for each unknown, examined character) is sampled at different rates in loading and unloading different registers. In this regard, if the sampling rate of a succeeding register is smaller than the rate of unloading of a prior register this process reduces the size of the character represented by the data. However, if the succeeding sampling rate is greater than the original rate, the normalizing effect is to increase the effective character size, and incidentally to broaden the lines of the character. Although my invention contemplates both alternatives, the subsequent description deals mainly with normalizing in the former mode, i.e. to obtain an effective reduction in character size.

Other objects and features of importance will become apparent in following the description of the illustrated forms of the invention which are given by way of example only.

FIGURE 4 is a partially schematic view showing a modification of the reading machine of FIGURE 3.

FIGURE 6 is a schematic view showing a height detector whose output is used to set the previously mentioned sampling rate in the reading machine.

FIGURE 7 is a diagrammatic view showing a width detector for the same purpose as the height detector of FIGURE 6.

*Preface*

Figure 1:
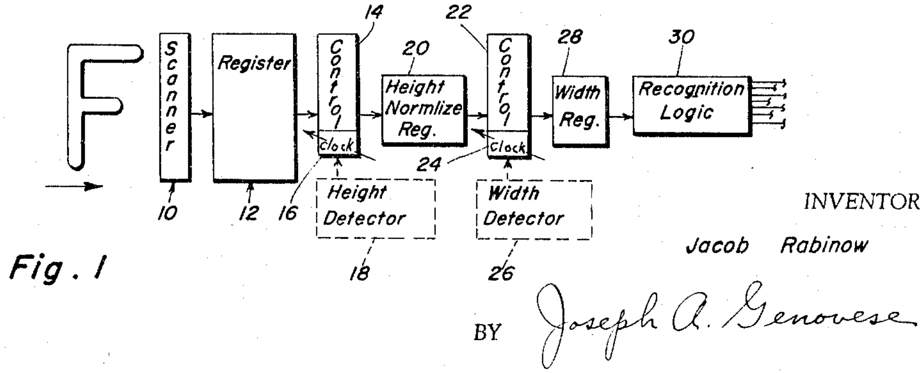
FIGURE 1 is a functional block diagram showing one method of using my invention in an otherwise conventional reading machine.

Attention is directed to FIGURE 1 showing the image of a character moving to the right toward a conventional scanner 10. The scanner examines the character image in the usual manner and the character-describing data extracted from the character image by the scanner is loaded into a register 12 having a capacity at least equal to the size of the largest character which the machine is designed to identify.

In accordance with one form of my invention, after register 12 is loaded, a control circuit 14 causes the register to be unloaded at a predetermined rate. During unloading, means (described later) including an adjustable clock 16 (e.g. an oscillator, a preset counter, a pulse burst generator, etc.) are used to sample the character-describing data at a rate different from the nominal bit rate at which the register is unloaded. The sampling rate can be manually set or set by height detector 18. Thus, owing to the sampling, a new set of character-describing data is developed and loaded into the height normalized register 20. It is, of course, understood that for height normalizing, the character describing data in register 12 is unloaded in a manner such that the height dimension of the character represented by this data is normalized by the sampling clock 16.

When the new set of data is stored in register 20, control circuit 22 provides shift pulses to horizontally unload the second register 20. As the data in register 20 is horizontally (because it is to be width-normalized) unloaded, clock 24 causes the data being unloaded from register 20 to be sampled at a rate different from the normal bit rate at which register 20 is operated. Here again, clock 24 can be manually set or set by a width detector 26. Thus, when the rata from register 20 is transferred to the width normalized register 28, the character-describing information representing the character is normalized as to character height and width. Thereafter, conventional recognition logic circuitry 30 is used to identify the character. Thus, beginning with a character which is far too large to match the character standards built in the recognition logic, my invention makes it possible to present character defining data (stored in register 28) of substantially the exact size required by the character standards of the recognition logic 30.

Figure 2:
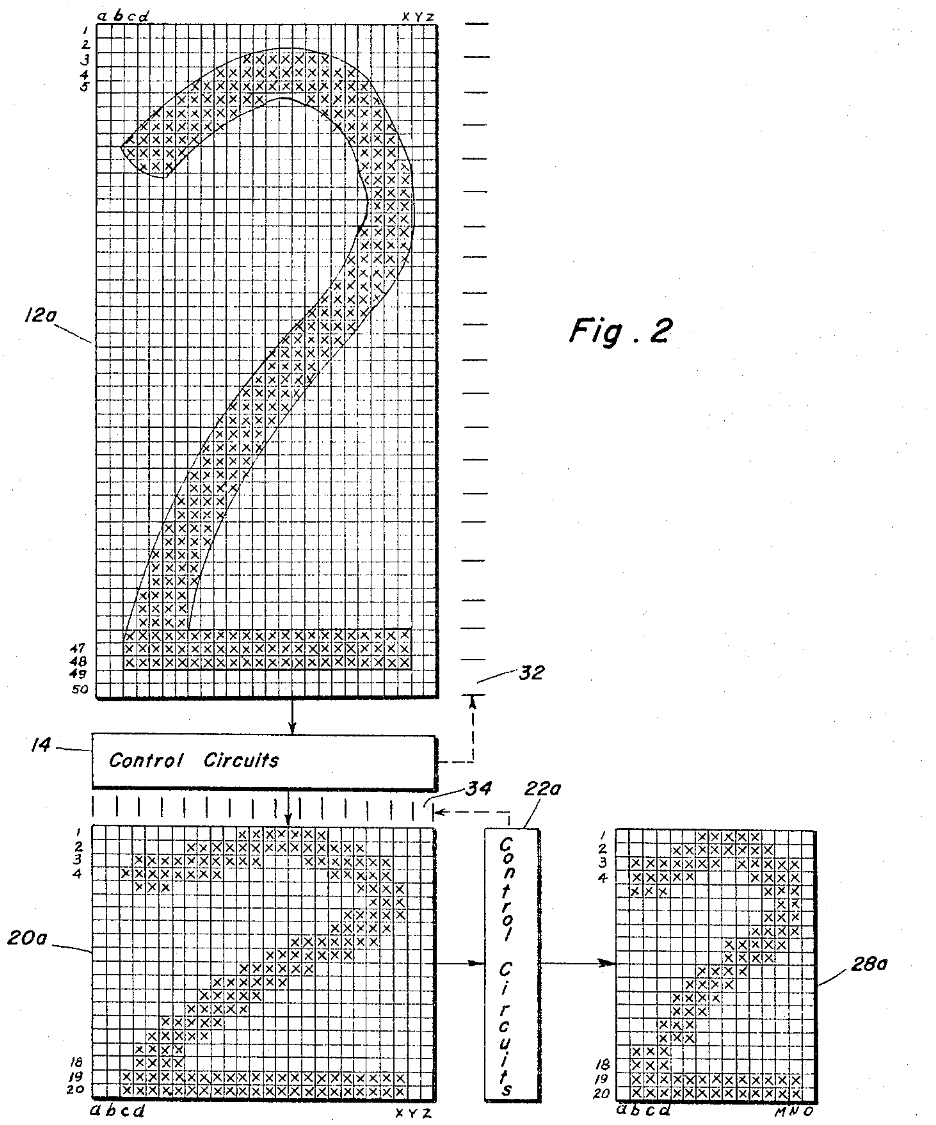
FIGURE 2 is a schematic view to scale showing my digital normalizing system and its effect on the relative proportions of a character represented by the character height and width describing data in the three registers of FIGURE 1.

In the early part of this description I gave an example of what is presently considered to be a high resolution machine. The original register was assumed to have a capacity of 14,000 stages. A machine having such resolution would be capable of exceedingly high performance, but the expense of construction is appreciable. In FIGURE 2, I have illustrated the registers of a machine having considerable less resolution, but far more resolution than is required for most reading tasks. The first register **12*a* has 1,300 stages, i.e. a capacity to store simultaneously 1,300 bits. As in FIGURE 1, register 12*a*** is loaded by any kind of scanner, and a typical character "2" is represented by the character-describing data in the form of set flip-flops, cores, etc. identified by the *x*'s. When the character-describing data is stored in this manner, control circuitry 14 is responsible for initiating shift pulses to vertically unload the 26 columns of register **12*a* (identified at A–Z inclusive) at a given rate. The control circuitry 14 is also responsible for sampling independently but concurrently the information as it ripples out register 12*a* vertically downward toward register 20*a*. The sampling is accomplished at a rate different from the shift rate, for example the illustrations show twenty sample times represented at 32 to the right of register 12*a*, but the total sampling is accomplished during the same time that register 12*a* has stepped 50 times vertically downward toward register 20*a*. The new set of data resulting from the twenty samples is stored into the height normalized register 20*a* so that the new set of character-describing data is vertically normalized to a height of twenty stages in register 20a**.

When the height normalized data is stored in register 20a, it comes under the control of circuits 22a which have the following functions: they provide shift pulses to unload register 20a in a horizontal direction, i.e. rows 1–20 are horizontally unloaded to the right at a given pre-determined rate. At the same time, each horizontal row of register 20a is individually sampled at a sampling rate determined by the setting of clock 24 (FIGURE 1) which is different from the shift rate of register 20a. For example, the sample times are schematically shown at 34 and by count it will be noted that there are fifteen sample times which commence simultaneously with the beginning of the unloading register 20a and terminate at the end of that unloading period. Thus, the character-describing data which is shifted from register 20a into register 28a is horizontally (character width dimension) compressed owing to the fact that there are fifteen samples 34 during the time that the twenty-six stages of register 20a are unloaded. In his way the character-describing data is width normalized so that it is presented to the recognition logic in a dimensional form corresponding to the character standards (e.g. an electronic mask) to which it is compared.

*Detailed description*

Figures 3, 5:
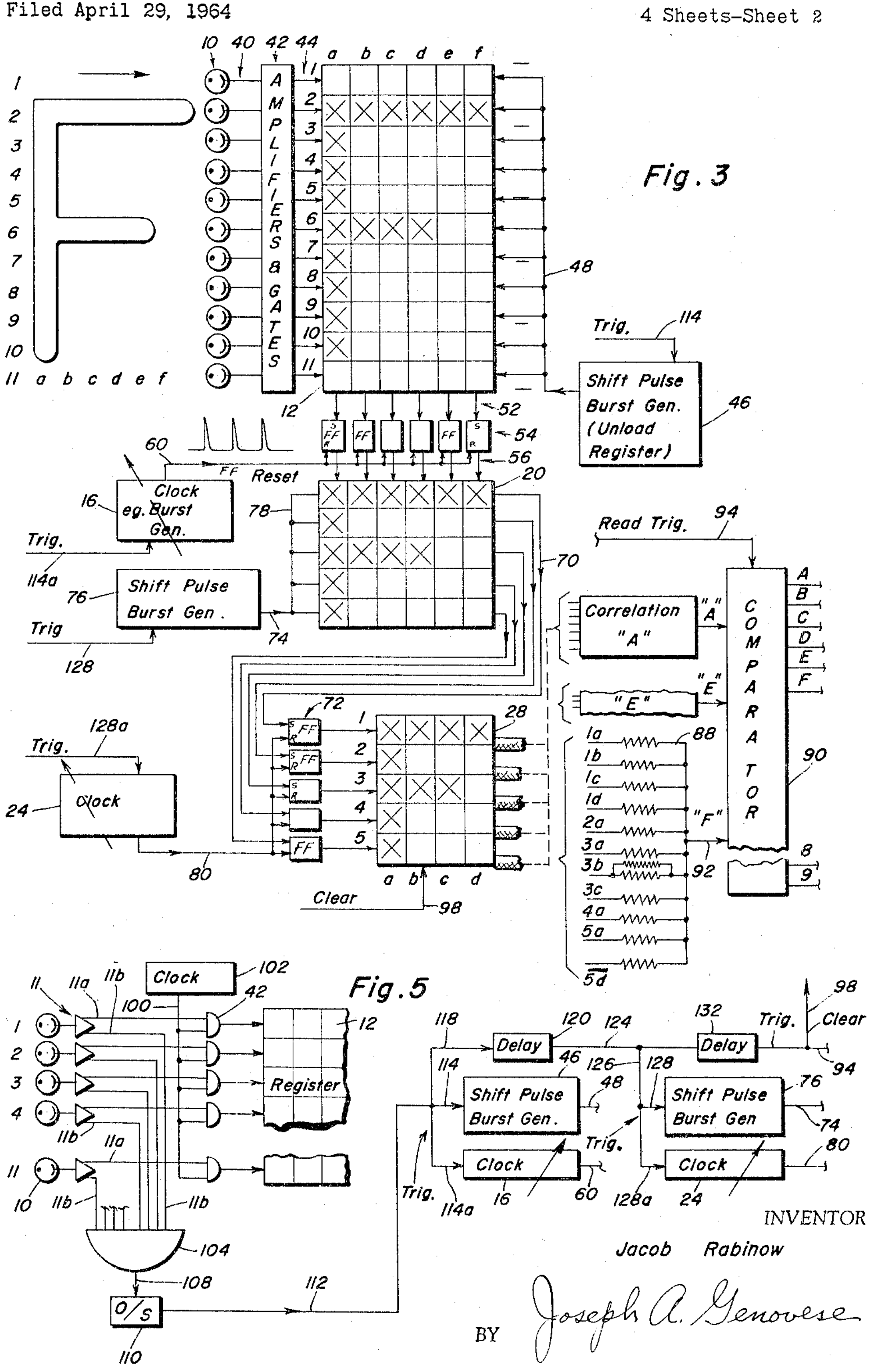
FIGURE 3 is a fragmentary diagrammatic view showing a reading machine equipped with the normalizing means of my invention, this view being of a machine having far less resolution than would ordinarily be required and shown in FIGURE 2.
FIGURE 5 is a fragmentary view showing a portion of the reading machine in FIGURE 3, and illustrating one of a number of possible ways to develop the necessary trigger signals for operation of the machine in FIGURE 3.

Attention is now directed to FIGURES 3–10 showing several forms of my invention embodied in reading machines of comparatively low resolution to simplify the drawings. In FIGURE 3 scanner 10 is made of a vertical row of photocells as, for example, in Patent No. 3,104,369. An image of the unknown character "F" is swept horizontally (to the right as shown in FIGURE 3) across the photocell scanner, and the output signals from the photocells are conducted on lines 40 to a set of amplifiers and AND gates 42 which can be substantially identical to the amplifiers and loading gates in Patent No. 3,104,369. Obviously, other loading methods, scanners, etc. can be substituted.

The output lines 44 from the gates 42 are operatively connected with register 12 to load the register column by column with character-describing data as extracted from the character image and its background by scanner 10. Column by column loading is illustrated merely because this is faster than pure serial loading, although it is obvious that as far as my invention is concerned these are equivalent.

When register 12 is loaded, the character-describing data therein is ready for the first digital normalizing procedure of my invention. This is accomplished by simultaneously shifting all columns of the register out by means of shift pulses conducted from burst generator 46 (or the equivalent) whose shift pulses are conducted on the network of lines 48 to each of the six illustrated columns of the shift register 12. The six illustrated information lines 52 (there being one line for each column of register 12) are connected to the "set" terminal of their respective loading flip-flops 54 whose output lines 56 are connected to the input terminals of the six columns of register 20. Register 20 is the height normalized register in that it stores a second set of data corresponding to the unknown character "F" in the manner described below.

A frequency adjustable clock 16 is triggered simultaneously with the triggering of the burst generator 46. (The origin of these and other trigger signals is described later.) The output line 60 of clock 16 conducts a group of flip-flop reset pulses and as shown, line 60 is connected to the "reset" terminal of the six illustrated flip-flops 54. The frequency of clock 16 is selected as described before, i.e. the sample time (time between reset pulses), is greater than the unloading bit rate of register 12. In the FIGURE 3 illustration, there are five sample times for the eleven vertical stages of the columns of shift register 12. Thus, during each sample time slightly more than two vertical stages of each column of the shift register are sampled to provide vertically normalized character-describing data which is conducted on lines 56 into register 20 in the following manner. During the first sample time slightly more than the two lower-most stages in each column of register 12 will be unloaded into the six illustrated flip-flops. Only the flip-flop to the left in the group will become set because a binary "1" appears only in column A of register 12 in the lower-most pair of stages. Thus, during the first sample time the output line of the left flip-flop of the group 54 will conduct a signal to be stored in the left column of register 20. Then all of the flip-flops are reset by the second pulse on line 60 to prepare them for the second sample which includes interrogation of the signals stored in rows 9, 8, and a fragment of 7 of the six vertical columns of register 12. The flip-flops load register 20 in a manner identical to that described above and this loading process is continued until register 12 is completely unloaded and the new, vertically normalized data is stored in register 20.

Thereafter register 20 is unloaded and a new set of character-describing data is developed and stored in the width normalized register 28. This is accomplished in a manner very similar to that described above except register 20 is unloaded horizontally (parallel to the width dimension of the character) and stored horizontally in register 28. Specifically, a set of lines 70 is connected to the ends of the horizontal rows of stages in register 20 and to the "set" terminals of a group 72 of loading flip-flops identical to loading flip-flops 54. Register 20 is unloaded by shift pulses conducted on line 74 which is connected to the output terminal of a shift pulse burst generator 76 and by a group of lines 78 to the stages of horizontal rows in register 20. Pulse burst generator 76 provides six shift pulses at a predetermined frequency. As a character-describing information ripples out of register 20 and is conducted on lines 70 to the "set" terminals of flip-flop 72, the sampling clock 24 provides a pulse burst of a different frequency, on line 80 which is connected with the "reset" terminals of the group of flip-flops 72. In accordance with the illustrated example, register 20 is six columns wide, while register 28 is only four columns wide. Thus, the sample timing represented by the frequency of the signal conducted on line 80, is such as to commence with the unloading of register 20 and terminate with the completing of unloading of register 20, but with only four samples taken. In this way the character-describing data is normalized as to width in digital steps, each corresponding to one and one-half stages of each horizontal row of register 20.

Thus, the character-describing data is normalized in this manner, and its size is standardized so that it will match the rigid (usually prewired) character standards to which it is compared to provide a character-identity signal. The character standards may be of many forms and therefore I have only fragmentarily illustrated correlation resistor arrays 88 and a comparator 90 which can, for example, be constructed like the correlation devices and comparator in Patent No. 3,104,369. In that patent assertion, negation, and weighting techniques are used and, of course, they can be used in my present invention. To complete the disclosure herein, it is noted that the correlation devices for each of the characters that the machine is expected to identify constitute the character standards against which the data in register 80 is compared. The resistor arrays develop match voltage signals on their respective output lines (e.g. line 92 for correlation device 88), and the match voltage signals are conducted as inputs to comparator 90. A read-trigger signal is conducted on line 94 to trigger the comparator which selects the "best" match signal on the various lines as representing the unknown character. Thereafter register 28 is cleared by a signal on line 98, and the reading machine is thereby prepared to identify another character.

FIGURE 5 is a fragmentary illustration showing only one of many satisfactory ways to provide the necessary trigger signals for operation of the machine in FIGURE 3. I have selected the subject matter of FIGURE 6 for illustration merely because it is very simple, easily understood, and in many respects, quite similar to corresponding subject matter in Patent No. 3,104,369. To the left of FIGURE 5 I have reproduced (fragmentarily) scanner 10 and shown amplifiers 11 connected with the respective photocells of the scanner. The amplifiers provide complemental outputs, e.g. the upper wire 11*a* of each amplifier can conduct a positive signal when its photocell experiences "darkness" and the lower wire 11*b* will conduct a negative signal under the condition. However, when the photocells experience "white" the signal conduction is inverted, i.e. line 11*a* will conduct a negative signal and line 11*b* will conduct a positive signal. Lines 11*a* are connected with their respective AND gates 42 as one input of each, and the other input of each AND gate is conducted on line 100 from a timing clock 102 which is synchronized with the horizontal motion of the character image, whereby gates 42 (and hence the photocells of the scanner) are interrogated in time with the horizontal motion of the character image. This loads the register 12, column by column, in the manner described before.

One way to ascertain that the character image has been fully examined is to seek the clear white space between adjacent characters, although this is certainly not the only way that this intelligence can be obtained. Since seeking the clear white space is simplest to illustrate, I have an AND gate 104 whose inputs are the lower wires 11*b* from the amplifiers 11. Thus, when all of the photocells simultaneously see "white" the signals on all of the wires 11*b* will be positive thereby satisfying gate 104 and providing an output signal on line 108. This actuates a one shot multivibrator 110 (or the equivalent) to provide a master control signal on line 112. This signal is conducted over trigger line 114 to actuate the shift pulse generator 46. At the same time the master pulse on line 112 is conducted over line 114*a* to trigger clock 16 so that there is starting synchronism between the unloading of register 12 and sampling of the information which ripples from that register.

The master control pulse on line 112 is also conducted on line 118 through a delay 120 to the shaft pulse burst generator 76 and the clock 24 via lines 124, 126, 128 and 128*a*. The time delay 120 is adjusted in a manner such that the shift pulse burst generator 76 and clock 24 are started when the second set of character-defining data is fully stored in register 20. It is an obvious variation to use digital counting instead of real time (delay 120) to trigger shift pulse generator 76 and clock 24. As described before the shift pulse burst generator is responsible for unloading register 20 while clock 24 is responsible for sampling the outputs of the horizontal rows of stages of shift register 20.

Thereafter, the read trigger signal for comparator 90 (FIGURES 3 and 5) is made available on line 94. Again, I can use a delay 132 in line 124 and have line 94 connected with the output side of the delay, or I can use digital counting means (for example a counter connected with the output of clock 24) to yield the read trigger signal. After the read trigger signal has caused the comparator 90 to function, register 28 is cleared by a clear signal (or burst) on line 98 which can, for example be connected with line 94 through a delay if found necessary in view of the time constants of the components.

In the above description the extent to which the characters are normalized is governed by the frequency of clock 16 (for height normalizing) and clock 24 (for width normalizing) as compared to the frequencies of the shift generators 46 and 76 respectively. Since both clocks are adjustable independently of each other, it is possible to have my machine normalize characters of a very wide variety of fonts so that the machine will be capable of identifying them. For example, the machine may be called upon to identify for a period of time characters whose width to height proportions are 5 x 9, and then called upon to identify 5 x 7 characters. Although the same width normalization will be required in both cases, different height normalization will be necessary, and this can be accomplished by manual adjustment of clocks 16 and 24.

Either in lieu of or in addition to the manual adjustment capability of clocks 16 and 24, they may be automatically adjusted as mentioned earlier. Basically all that is required for automatic adjustment of clocks 16 and 24 is a knowledge of the character height and width. The necessary information can be obtained by using a prescanner as disclosed in U.S. Patent No. 3,104,369. Alternatively, on in addition, height and width detectors as disclosed in Patent No. 3,189,873 can be used. Should it be desired, height and width detectors as disclosed in Patent No. 3,179,922 may be used. It is understood, of course, that height and width detectors disclosed in the above patents deal with the reading machine scanner and/or pre-scanner. In each instance, the height and width of the characters are measured and electrical signals are provided. These electrical signals can be used to adjust the frequency of clocks 16 and 24 herein.

As a further alternative I have illustrated the details of height detector 18 in FIGURE 6 and width detector 26 in FIGURE 7. These differ from the height detectors in the above patents in that they examine the character-describing data internally of the machine, i.e. after it is extracted from the character image by means of the scanner.

Height detector 18 (FIGURE 6) operates by examining the horizontal rows of register 12, and those rows which contain a portion of the character provide digital output signals. The digital output signals are added to provide an analog signal whose value corresponds to the number of horizontal rows containing a portion of the character. Clock 16 has its frequency adjusted to correspond to the above analog signal.

FIGURE 6 shows AND gate 140 whose input lines 142 are connected to the output terminals of each stage of the first horizontal row of register 12. OR gate 144 is similarly conected to the stages of the second horizontal row, and OR gate 146 has its input lines 148 connected to the respective stages of the lower-most horizontal row of stages of register 12. It is understood that stages 3–10 which are not shown in FIGURE 6 are likewise connected to OR gates. The output lines 150 of the entire group of OR gates are connected with resistor adder 152 whose output line 154 conducts an analog signal whose value will depend upon the number of horizontal rows of register 12 containing any part of the character. Analog signal line 154 constitutes an input to analog AND gate 156 whose only other input is on line 112 of the one shot multivibrator 110 (FIGURE 5). Thus, gate 156 passes a signal on line 160 at the time that the main control signal on line 112 is given (the character-describing data has been loaded into register 12). The analog signal on line 160 is used to adjust the frequency of clock 16 in accordance with analog signal on line 160, and this corresponds to the height of the character-describing data stored in register 12. It is understood that the frequency adjusting signal on line 160 could be used to trigger the clock 16 although the trigger line 114 (from one shot 112) is shown separately.

The width detector 26 shown in FIGURE 7 is philosophically identical to the height detector. The only distinction is that all of the stages of a single vertical column of register 12 are connected with an OR gate. I have shown only two OR gates 70 and 72 connected to the first and last columns of register 12 but it is understood that the intermediate columns of the register are similarly equipped with OR gates whose output lines 174 are connected to resistor adder 176. The analog output on line 178 of the resistor adder 176 is conducted to analog AND gate 180 whose other input is on line 112 from the one shot multivibrator 110. The output line 182 of the analog gate 180 is connected to clock 24 to adjust the frequency thereof in accordance with the width of the character-describing data as measured in register 12.

There are some advantages in using information regarding character size which is obtained before the character is loaded into the first register in the reading machine. The same is true when relying on manual adjustment of clocks 16 and 24. FIGURE 4 illustrates one advantage, i.e. the first register 12*b* can be made to consist of only one column. Since the first register may be the largest (as shown best in FIGURE 2) a material saving in equipment is realized. The reading machine of FIGURE 4 includes a scanner, amplifiers and gates just as in FIGURE 3. If the character height is known beforehand, as by human inspection or by a height detector associated with the scanner or a pre-scanner, the single column information is rippled out of the single column register at one rate under the control of the control circuitry 14*b*. The information is sampled at a different rate (just as in FIGURE 3) for storage in the height normalized register 20*b*. From this point on, the operation is identical to that of FIGURE 3. Control circuitry 22*b* is responsible for providing unload shift pulses for height normalized register 20*b*, and the character-describing data issuing therefrom is sampled at a frequency different from the bit rate of unloading of register 20*b*. Thus, the new data which is now width normalized is loaded into register 28*b*. The character-describing data in register 28*b* is of a size which is correct for the character standards of the recognition logic 30*b*.

Figures 8, 9, 10:
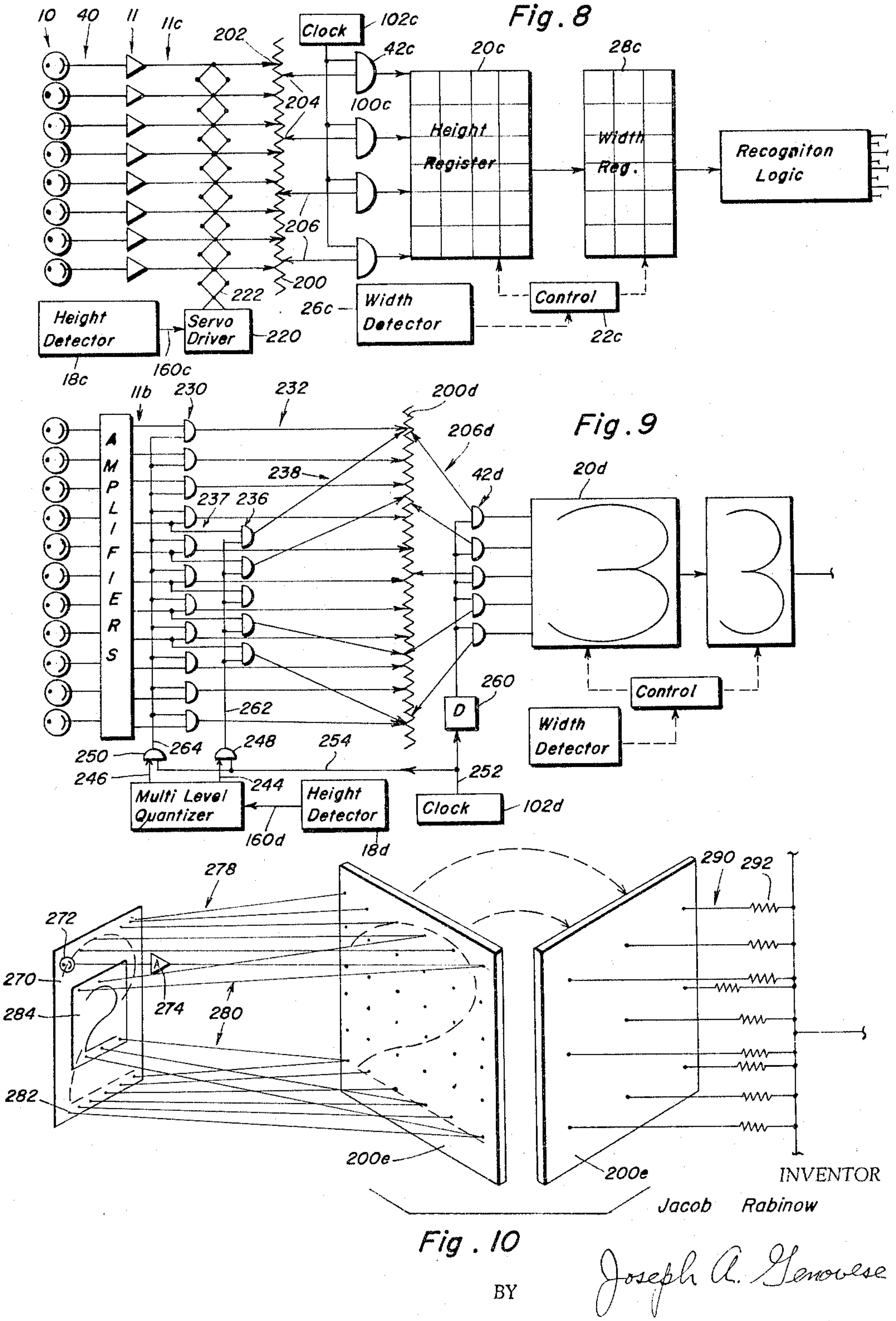
FIGURE 8 is a schematic view showing a further modification.
FIGURE 9 is a schematic view showing another modification.
FIGURE 10 is a schematic view showing another modification.

Now that the concepts of my invention have been explained and several embodiments described and examples given, attention is directed to FIGURES 8–10 which are schematic views showing additional possible ways to practice my normalizing invention.

FIGURE 8 shows scanner 10 whose photocells conduct analog signals on lines 40 to amplifiers 11 whose outputs are conducted on lines 11*c* to a multi tapped resistor 200. Lines 11*c* terminate in sliders 202 which contact resistor 200. Character normalized data outputs from the resistor 200 are picked off at taps 204, and if desired these too can be adjustable along the length of resistor 200. Conductors 206 are attached to taps 204 and form respective inputs to the AND gates 42*c* of the illustrated group. The other input to each gate 42*c* is from the register-loading (or photocell-sampling) clock 102*c* via lines 100*c*. The output lines of gates 42*c* conduct the character or pattern-describing data signals into the height normalize register 20*c*. Thereafter, the data stored in register 20*c* is conducted to width normalize register 28*c* under the influence and control of width detector 26*c* and control circuit 22*c* just as described in connection with the previous forms of my normalize system.

The distinction demonstrated in FIGURE 8 is that the first normalizing step (shown as height for convenience) is accomplished by resistor 200 which eliminates the need for the largest capacity register, e.g. register 12*a* in FIGURE 2. Also, FIGURE 8 is considerably simpler than previously described embodiments in a number of other respects. The larger number of photocell output signals (on lines 11*c*) are normalized to a smaller number of data signals (on lines 206) by the ratio of conductors (11*c* to 206) associated with resistor 200. The precise proportioning of conductors 11*c* used to normalize the height of the character to fit the height register 20*c* is obtained easily by manually positioning conductors 11*c* and hence their taps 204, or by automatic means (shown).

Height detector 18*c* can, for example, be similar to some of those described before and to simplify the disclosure assume that line 160*c* corresponds to line 160 of FIGURE 6 in the sense that line 160*c* conducts an analog signal whose value corresponds to the height of the character (usually its image). The signal on line 160*c* actuates a servo driver 220 through a distance corresponding to the value of the analog signal (e.g. like a volt or ammeter). If desired, the signal on line 160*c* can be converted to a digital pulse train in which case servo driver 220 can be a digital stepping motor. In either case the purpose of servo driver 220 is to operate the lazy tong linkage 222 to position the attached conductors 11*c* and their sliders 202 along the length of resistor 200 to correspond to the character height.

FIGURE 9 shows an embodiment which can be considered as an electronic logic analogy of FIGURE 8. Instead of positioning sliders, as at 202, along a resistor in accordance with the height of a character, logic gating is used to accomplish the same result. In the former embodiment (FIGURE 8) amplifiers 11 were assumed to be linear, but they can be quantizing amplifiers. Thus, the amplifiers 11, resistor 200 and gates 42*c* form a digital-to-analog-to-digital converter for normalization. In FIGURE 9 the data is transformed in the same way, i.e. digital-to-analog-to-digital and for the same purpose.

Accordingly, the amplified scanner output signals on lines 11*d* (one line for each photocell of the scanner) are conducted to a first set of AND gates 230 whose output lines 232 are connected at spaced points along the length of resistor 200*d*. A small number of AND gates 236 (for smaller characters) have, as input conductors, a fraction of the number of lines 11*d*. Lines 237 show this by their connection with lines 11*d* and gates 236. The output lines 238 of gates 236 are connected with resistor 200*d* along its length with a spacing larger than the spacing of lines 232 because there are fewer lines 238. The lines 206*d* from resistor 200*d* are connected as input conductors for AND gates 42*d* whose output lines load the height normalize register 20*d*. From this point on to the recognition logic this embodiment is the same as FIGURE 8.

In operation, height detector 18*d* provides an analog signal on line 160*d* as described before. This signal is conducted to a multilevel quantizer (e.g. as disclosed in U.S. Patent No. 3,104,369) providing an output on one or the other of two lines 244 and 246, depending on the value of the analog signal on line 160*d*. These lines form inputs to respective AND gates 248 and 250 whose other input is obtained from the loading clock 102*d* via lines 252 and 254. The clock pulses on line 252 interrogate the register loading (or scanner-sampling) gates 42*d*, through delay 260.

The output lines 262 and 264 of gates 248 and 250 respectively sample either the set of gates 236 or 230 depending on which of the quantizer lines 244 or 246 passes the clock pulses. This, in turn, depends on the height of the character. Although only two sets of normalize gates 230 and 236 are shown, it is obvious that additional sets or a different arrangement can be used to obtain a finer degree of normalization.

FIGURE 10 is a schematic showing a photocell retina scanner 270, although only one photocell 272 and its amplifier 274 are fully shown. The others are represented by sets 278 and 280 of lines associated with two areas 282 and 284 of the scanner. The former area has the image of the character "2" shown thereon in dotted lines, while the latter has the image of another, smaller "2" projected thereon.

Lines 278 extend from all photocells of area 282 of scanner 270 to a matrix of points on a carbon block (or other resistive material) resistor 200*e*. Lines 280 extend from the fewer photocells of area 284 of scanner 270 to the same matrix of points (but fewer of them) of resistor 200*e*. From the reverse side of resistor 200*e* (shown to the right of FIGURE 10), output lines 290 extend to the recognition logic of the machine, schematically represented as a resistor adder 292 or the like. The resistor 200*e* functions in a manner similar to resistors 200 or 200*d*, except the resistive block 200*e* provide additional two dimensional signal gradients (along *x* and *y* axis) for the character normalize data on lines 290.

It is understood that the previous description of several embodiments of my invention is given by way of example only, and that numerous changes may be made, and other obvious omissions or inclusions (e.g. quantizers for the analog signals ahead of the first register), without department from the protection of the following claims.

I claim:

1. In a reading machine for identifying characters of various sizes, wherein the machine has recognition logic circuitry for characters within a predetermined size parameter, the improvement comprising means for enabling said recognition logic to function with characters of a size outside of said parameter, said means including a first storage means to store information extracted from an unknown character, means to unload the first storage means at a first rate, sampling means to sample said information unloaded from said first storage means at a frequency different from the unloading frequency of said first storage means, second storage means for storing said sampled information, and means for operatively connecting said second storage means with said recognition logic circuitry.

2. The subject matter of claim 1 wherein said sampling means include digital devices so that the sampled information is effectively quantized as to the size of the character represented by said stored information.

3. The subject matter of claim 1 wherein said means connecting said second storage means to said recognition logic include a third storage means, and control means for causing said second storage means to unload its stored information and for sampling the last mentioned information at a sampling frequency different from the frequency of said last mentioned information as it is unloaded from said second storage means.

4. The subject matter of claim 1 wherein said sampling means have means to manually adjust the said frequency thereof.

5. The subject matter of claim 1 and means for detecting at least one dimension of the size of an unknown character and providing an output signal related to said dimension size, and means for adjusting the frequency of said sampling means in response to the last mentioned signal.

6. In a normalizing character reading machine having a scanner, a first register to store signals corresponding to the outputs of said scanner, the stored signals representing a scanned character in a first physical size as to its height and width dimensions, a second register, means to shift the stored signals from the first register, and means responsive to the shifted signals for loading said second register with second signals representing the scanned character but normalized in one of said dimensions, means to shift out said second register, a third register, means responsive to the data shifted from said second register to provide third signals representing the scanned character but normalized in the other of said dimensions, and means to load said third register with said third signals.

7. The subject matter of claim 6 and decision means operatively connected with said third register to provide character-identity signals in response to said third signals.

8. In a normalizing character reading machine having a scanner to scan the characters, a first storage device to store signals corresponding to the outputs of said scanner, the stored signals representing a scanned character in a first physical size as to its height and width dimensions, means to withdraw the stored signals from said first storage device and for providing second signals representing the scanned character, but normalized as to size measured along one of said dimensions, a second storage device, means to conduct said second signals to said second storage device, means to withdraw the stored second signals from said second storage device and for providing third signals representing the scanned character but normalized as to size measured along both of said dimensions, a third storage device, and means to conduct said third signals into said third storage device.

9. In a character reading machine which normalizes the information extracted from the characters to facilitate the reading function and which has a scanner to scan the characters and provide outputs corresponding to the information extracted by the scanning of each character, means responsive to said outputs for providing a first group of data whose arrangement is in a first physical size as to height and width dimensions and corresponds to at least a portion of the scanned character, and a storage device to store said group of data, the improvement comprising means for shifting the stored data from said storage device at a predetermined rate, means responsive to the shifted data for providing a second group of data and for arranging said second group of data in a manner such that the arrangement of data has a different size as measured along at least one of said dimensions, said second group of data providing and arranging means including means to sample said shifted data at a rate different from said predetermined rate, and decision means responsive to at least said second group of data for identifying the scanned character.

10. In a reading machine having means to examine characters and provide outputs corresponding to the examined characters, means responsive to said outputs for storing first data representing at least a portion of an unknown examined character with the representation corresponding to the physical size of the portion of the unknown character, means to normalize the representation of said first data and for providing a second set of data representing said portion of the unknown character but with the second representation corresponding to a modified size of the stored character portion, said normalizing means including means to shift said first data from said storing means, means for sampling the shifted data at a rate different from the shift rate thereby providing said second set of data, a second data storing means, and means to commit said second data to said second storage means.

References Cited by the Examiner

UNITED STATES PATENTS

| | | | |
|---|---|---|---|
| 3,173,126 | 3/1965 | Rabinow | 340—146.3 |
| 3,179,922 | 4/1965 | Rabinow | 340—146.3 |
| 3,179,923 | 4/1965 | Rabinow | 340—146.3 |
| 3,234,513 | 2/1966 | Brust | 340—146.3 |

MAYNARD R. WILBUR, *Primary Examiner.*

MALCOLM A. MORRISON, *Examiner.*

J. E. SMITH, *Assistant Examiner.*